United States Patent
Ho et al.

(10) Patent No.: US 10,341,923 B2
(45) Date of Patent: Jul. 2, 2019

(54) TECHNIQUES FOR MINIMIZING USER DISRUPTION DURING NETWORK CONNECTION SWITCHING

(71) Applicant: Google Inc., Mountain View, CA (US)

(72) Inventors: Casey Kwok Ching Ho, San Jose, CA (US); Weihua Tan, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/010,363

(22) Filed: Jan. 29, 2016

(65) Prior Publication Data
US 2017/0223598 A1    Aug. 3, 2017

(51) Int. Cl.
| | | |
|---|---|---|
| H04L 12/26 | (2006.01) |
| H04W 36/26 | (2009.01) |
| H04W 24/08 | (2009.01) |
| H04W 76/20 | (2018.01) |
| H04W 36/24 | (2009.01) |
| H04W 36/14 | (2009.01) |
| H04W 84/12 | (2009.01) |

(52) U.S. Cl.
CPC ............ *H04W 36/26* (2013.01); *H04L 43/16* (2013.01); *H04W 24/08* (2013.01); *H04W 36/24* (2013.01); *H04W 76/20* (2018.02); *H04W 36/14* (2013.01); *H04W 84/12* (2013.01)

(58) Field of Classification Search
None
See application file for complete search history.

(56) References Cited

U.S. PATENT DOCUMENTS 5,826,188 A * 10/1998 Tayloe ............... H04B 7/18563
                                                          455/428
6,381,315 B1    4/2002 Nhaissi
(Continued)

FOREIGN PATENT DOCUMENTS

EP    1885144 A2    2/2008
EP    2244502 A1    10/2010
(Continued)

OTHER PUBLICATIONS

European Patent Office; International Search Report and Written Opinion; International Application No. PCT/US2016/066524; dated Mar. 17, 2017.
(Continued)

*Primary Examiner* — German Viana Di Prisco
(74) *Attorney, Agent, or Firm* — Faegre Baker Daniels LLP

(57) ABSTRACT

A computer-implemented technique can include establishing, by a mobile computing device having one or more processors, a first cellular connection between the mobile computing device and a first cellular carrier associated with a mobile virtual network operator (MVNO), detecting, by the mobile computing device, a condition indicative of (i) a level of cellular activity via the first cellular connection below an inactivity threshold and (ii) an available second cellular connection with a different second cellular carrier associated with the MVNO, and in response to detecting the condition: (a) terminating, by the mobile computing device, the first cellular connection, and (b) initiating, by the mobile computing device, the second cellular connection with the second cellular carrier associated with the MVNO.

18 Claims, 2 Drawing Sheets

(56) References Cited

U.S. PATENT DOCUMENTS

| | | | |
|---|---|---|---|
| 7,180,898 B2 | 2/2007 | Yoshida et al. | |
| 7,289,808 B1* | 10/2007 | Uskela | H04W 36/0011 |
| | | | 370/311 |
| 7,433,929 B2 | 10/2008 | Guilford et al. | |
| 7,809,360 B2 | 10/2010 | Agrawal et al. | |
| 8,391,192 B2 | 3/2013 | Prakash et al. | |
| 8,484,568 B2 | 7/2013 | Rados et al. | |
| 8,590,023 B2 | 11/2013 | Gupta et al. | |
| 2002/0169716 A1 | 11/2002 | Johnson et al. | |
| 2004/0017795 A1 | 1/2004 | Abraham et al. | |
| 2004/0095945 A1* | 5/2004 | Woog | H04W 8/12 |
| | | | 370/401 |
| 2004/0233866 A1* | 11/2004 | Bossoli | H04W 36/0033 |
| | | | 370/328 |
| 2004/0246920 A1 | 12/2004 | Savolainen | |
| 2005/0143071 A1* | 6/2005 | Jaakkola | H04W 48/18 |
| | | | 455/436 |
| 2007/0037550 A1 | 2/2007 | Armstrong et al. | |
| 2007/0147317 A1 | 6/2007 | Smith et al. | |
| 2008/0002612 A1* | 1/2008 | Haumont | H04W 36/24 |
| | | | 370/328 |
| 2008/0009279 A1 | 1/2008 | Sakawa | |
| 2008/0085707 A1* | 4/2008 | Fadell | H04W 8/065 |
| | | | 455/435.3 |
| 2008/0107051 A1 | 5/2008 | Chen et al. | |
| 2009/0061862 A1 | 3/2009 | Alberth, Jr. et al. | |
| 2009/0298467 A1 | 12/2009 | Zohar | |
| 2010/0017861 A1* | 1/2010 | Krishnaswanny | H04W 48/18 |
| | | | 726/7 |
| 2010/0124203 A1* | 5/2010 | Tenny | H04W 36/24 |
| | | | 370/331 |
| 2010/0304737 A1 | 12/2010 | Jain et al. | |
| 2011/0096673 A1 | 4/2011 | Stevenson et al. | |
| 2011/0199934 A1* | 8/2011 | Olofsson | H04W 76/046 |
| | | | 370/252 |
| 2011/0306318 A1 | 12/2011 | Rodgers et al. | |
| 2012/0014271 A1 | 1/2012 | Damenti | |
| 2012/0020325 A1* | 1/2012 | Swamy | H04W 36/14 |
| | | | 370/331 |
| 2012/0052914 A1 | 3/2012 | Yaqub et al. | |
| 2012/0094653 A1 | 4/2012 | Okuda | |
| 2012/0195223 A1 | 8/2012 | Raleigh | |
| 2012/0282915 A1 | 11/2012 | Haynes et al. | |
| 2013/0040693 A1 | 2/2013 | Chen et al. | |
| 2013/0107727 A1* | 5/2013 | Lunden | H04W 52/0216 |
| | | | 370/252 |
| 2013/0148567 A1 | 6/2013 | Efrati et al. | |
| 2013/0155842 A1 | 6/2013 | Moore et al. | |
| 2013/0203438 A1 | 8/2013 | Shin | |
| 2015/0098393 A1 | 4/2015 | Tofighbakhsh et al. | |
| 2015/0127939 A1 | 5/2015 | Mazandarany et al. | |
| 2015/0141037 A1 | 5/2015 | Saha et al. | |
| 2015/0281198 A1 | 10/2015 | Lee et al. | |
| 2016/0037340 A1 | 2/2016 | Rayment et al. | |
| 2016/0261596 A1 | 9/2016 | Khello et al. | |

FOREIGN PATENT DOCUMENTS

| | | |
|---|---|---|
| WO | 2002-041580 A1 | 5/2002 |
| WO | 2004-047476 A1 | 6/2004 |
| WO | 2006-005947 A1 | 1/2006 |
| WO | 2008-060464 A2 | 5/2008 |
| WO | 2011-162688 A1 | 12/2011 |
| WO | 2014-011094 A1 | 1/2014 |
| WO | 2015/100683 A1 | 7/2015 |
| WO | 2015-158263 A1 | 10/2015 |

OTHER PUBLICATIONS

Ericsson: "RAN-ANDSF Interwor", 3GPP DRAFT; R2-133440-WLAN 3GPP Radio Interworking—ANDSF Interworking, 3rd Generation Partnership Project (3GPP), Mobile Competence Centre; vol. RAN WG2; Sep. 27, 2013.

Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.

Bircher et al., "An Agent-Based Architecture for Service Discovery and Negotiation in Wireless Networks," University of Bern, Wired/Wireless Internet Comms. (WWIC), Jan. 21, 2004.

Levy, Martyn, "Best-Practice Authentication Methods for Wi-Fi Offload," http://www.acurixnetworks.com/single-post/2013/05/20/BestPractice-Authentication-Methods-For-WiFi-Offload, May 20, 2013.

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.

Venkiteswaran, Sriram, "Google Project Fi—New Era for Mobile Technology?", http://blog.mojonetworks.com/google-project-fi-new-era-for-mobile-technology, MojoBlog, May 19, 2015.

VoLGA Forum, "VoLGA Stage 2 V1.7.0: Voice over LTE via Generic Access," Jun. 14, 2010.

Qualcomm Europe et al., "Text Proposal for UE Measurements for Minimizing Drive Tests," 3GPP TSG-RAN WG2 Meeting #66, R2-093175, May 4-8, 2009.

Qualcomm Europe, "Framework for UE SON Reports," 3GPP TSG RAN WG3 & SA WG5, S5-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

Nikravesh et al., "Mobile Network Performance from User Devices: A Longitudinal, Multidimensional Analysis," Passive and Active Measurement: 15th International Conference, PAM 2014, Mar. 10-11, 2014.

\* cited by examiner

TECHNIQUES FOR MINIMIZING USER DISRUPTION DURING NETWORK CONNECTION SWITCHING

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A mobile network operator (MNO) is a provider of wireless communication services and that owns or controls all of the components necessary to deliver, to an end user, radio spectrum allocation. MNOs may also be referred to as wireless service providers, wireless carriers, cellular carriers, and/or mobile network carriers. MNOs may also sell access to their network services to mobile virtual network operators (MVNOs). For example, MVNOs may purchase network services from a MNO at a wholesale rate, and then resell the network services to the end user. In this manner, MVNOs may not have the overhead costs associated with purchasing and maintaining all of the necessary components that are owned and controlled by the MNO. For a particular MNVO that is associated with multiple MNOs, there may be situations where it is desirable to a switch between MNOs at the end user's device.

SUMMARY

A computer-implemented technique is presented. In one implementation, the technique can include establishing, by a mobile computing device having one or more processors, a first cellular connection between the mobile computing device and a first cellular carrier associated with a mobile virtual network operator (MVNO), detecting, by the mobile computing device, a condition indicative of (i) a level of cellular activity via the first cellular connection below an inactivity threshold and (ii) an available second cellular connection with a different second cellular carrier associated with the MVNO, and in response to detecting the condition: (a) terminating, by the mobile computing device, the first cellular connection, and (b) initiating, by the mobile computing device, the second cellular connection with the second cellular carrier associated with the MVNO.

A mobile computing device is also presented. In one implementation, the mobile computing device can include a memory configured to store a set of instructions, a communication device configured to transmit and receive information, and one or more processors configured to execute the set of instructions, which causes the one or more processors to perform operations. In one implementation, the operations can include controlling the communication device to establish a first cellular connection between the mobile computing device and a first cellular carrier associated with an MVNO, detecting a condition indicative of (i) a level cellular activity via the first cellular connection below an inactivity threshold and (ii) an available second cellular connection with a different second cellular carrier associated with the MVNO, and in response to detecting the condition, controlling the communication device to: (a) terminate the first cellular connection, and (b) initiate the second cellular connection with the second cellular carrier associated with the MVNO.

In some embodiments, the condition can include an inactive state of a user interface of the mobile computing device. In some embodiments, the condition can include inactivity by one or more priority software applications executable by the mobile computing device.

In some embodiments, the condition can include the mobile computing device being connected to a non-cellular network. In some embodiments, the non-cellular network can be a WiFi network. In some embodiments, the condition can further include the mobile computing device being connected to a battery charging source.

In some embodiments, the condition can include a predicted period of inactivity between the mobile computing device and a user associated therewith. In some embodiments, the predicted period of inactivity can be either for (i) the user or (ii) an average user.

In some embodiments, the condition can include an absence of in-progress downloads to the mobile computing device via the first cellular connection. In some embodiments, the condition can include signal strength of the first cellular connection being below a threshold indicative of an unacceptable cellular connection.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
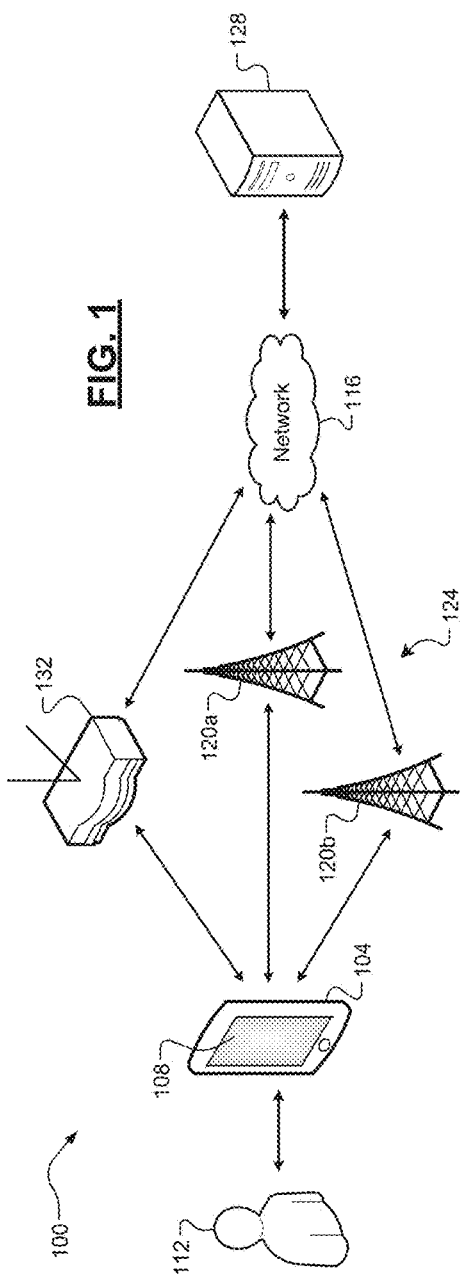
FIG. 1 is a diagram of an example computing system including an example mobile computing device according to some implementations of the present disclosure.

As previously mentioned, there may be situations where it is desirable for a mobile computing device to switch network connections. Examples of such network connection transitions can include, but are not limited to, (i) switching from one cellular carrier to another cellular carrier, (ii) switching from WiFi to a cellular carrier, (iii) switching from a cellular carrier to WiFi, (iv) switching between network types (e.g., Bluetooth, WiFi, wired (Ethernet or USB), etc.), (v) switching between different WiFi access points, and other similar network connection switching. For a mobile virtual network operator (MNVO) that is associated with multiple mobile network operators (MNOs), there may be situations where it is desirable to a switch between MNOs at an end user's mobile computing device. For example, the mobile computing device may travel from a particular region where one MNO provides a better cellular connection to another region where a different MNO provides a better cellular connection. The term "cellular carrier" as used hereinafter can refer to an MNO, which can also refer to wireless service providers, wireless carriers, and/or mobile network carriers. These MNOs own and operate all of the components required to provide a cellular network, and they often wholesale their network services to MVNOs, which may then resell the network services to end users. Switching between different cellular carriers has a latency, e.g., approximately ten to fifteen seconds, which is very different than conventional switching or handoffs between different cellular towers in the same cellular carrier network. The latency resulting from carrier switching can cause an undesirable disruption to the user's activities at the mobile computing device (downloading a file, streaming music, playing an on-line game, etc.). Therefore, it may be desirable to schedule any cellular carrier switching automatically and intelligently.

Accordingly, techniques are presented for minimizing user disruption when switching between different cellular carriers of a MVNO. The techniques can provide for intelligent scheduling of dynamic carrier switching such that user activity is not disrupted. Conventional MVNOs, for example, do not perform dynamic carrier switching and instead may assign a single MNO to a given user based on parameters, such as their billing address. The techniques can involve establishing a first cellular connection between a mobile computing device and a first cellular carrier associated with an MVNO. The techniques can detect a condition indicative of (i) a current or predicted level of cellular activity via the first cellular connection below an inactivity threshold and (ii) an available second cellular connection with a different second cellular carrier associated with the MVNO. For example only, the available second cellular connection may be a potentially better cellular connection than the first cellular connection. In the event that the current cellular connection is below a minimum strength threshold, a switch can be performed, regardless of the user activity, because the current cellular connection would be unacceptable to most or all users. In one implementation, the switch could be performed regardless of the user activity when both (i) the current cellular connection is below the minimum strength threshold and (ii) a difference between the current cellular connection and the new cellular connection is greater than a minimum strength improvement threshold. In response to detecting the condition, the mobile computing device can terminate the first cellular connection and establish a second cellular connection with the second cellular carrier of the MVNO.

Referring now to FIG. 1, an example computing system 100 is illustrated. The computing system 100 can include an example mobile computing device 104 according to some implementations of the present disclosure. The mobile computing device 104 can be any suitable computing device capable of connecting to a cellular network. Examples of the mobile computing device 104 include a mobile phone, a tablet computer, and a laptop computer. The mobile computing device 104 can include a user interface 108, such as a touch-sensitive or non-touch sensitive display, a physical keyboard, physical buttons, or a combination thereof. A user 112 can be associated with and can operate the mobile computing device 104. The mobile computing device 104 can be configured to communicate with other devices, such as a remote server 128, via a network 116. The network 116 can be a local area network (LAN), a wide area network (WAN), e.g., the Internet, or some combination thereof.

The mobile computing device 104 can connect to the network 116 via different types of connections. One example connection is a cellular connection to a cellular network. A different cellular network can be provided by first and second cellular carriers 120a, 120b (collectively "cellular carriers 120"). The cellular carriers 120 can each be associated with an MVNO 124. For example, the MVNO 124 may purchase network services from the cellular carriers 120 and resell the network services to the end-user (e.g., user 120 and her/his mobile computing device 104). The cellular carriers 120a, 120b, however, may otherwise be unaffiliated with each other. Another example connection is a WiFi connection to a WiFi network. The WiFi network can be managed by wireless computer router/modem 132. Once connected to the remote server 128 via the network 116, the mobile computing device 104 can perform various functions, such as for downloading or streaming data.

Figure 2:
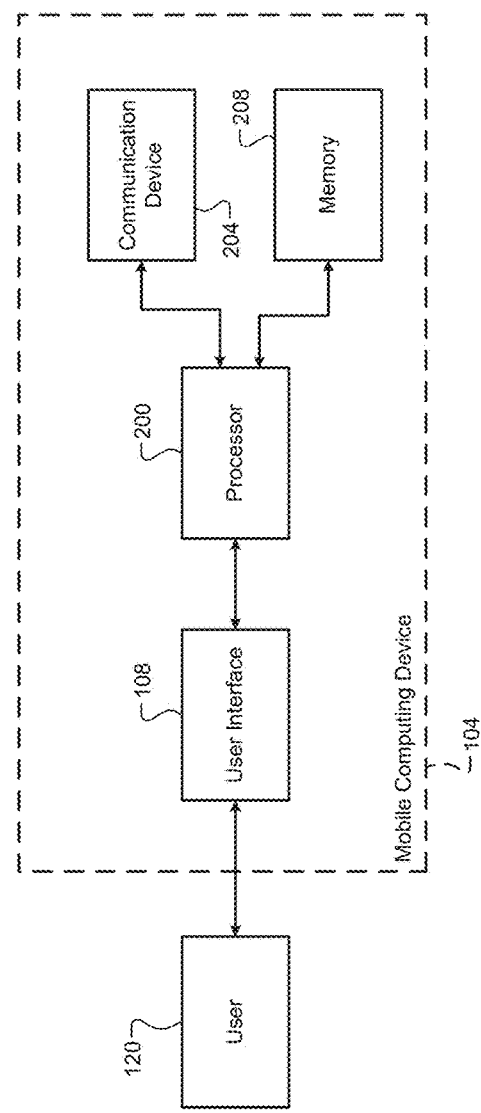
FIG. 2 is a functional block diagram of the example mobile computing device of FIG. 1.

Referring now to FIG. 2, a functional block diagram of the example mobile computing device 104 is illustrated. The mobile computing device 104 can include the user interface 108, a processor 200, a communication device 204, and a memory 208. The term "processor" as used herein can refer to both a single processor and multiple processors operating in a parallel or distributed architecture. The processor 200 can control operation of the mobile computing device 104, including, but not limited to, loading/executing an operating system of the mobile computing device 104, controlling input/output via the user interface 108, controlling communication via the communication device 204, and controlling read/write operations at the memory 208. The communication device 204 can include any suitable components for communication with the network 116 via the cellular carriers 120 or the router/modem 132, such as a transceiver. The memory 208 can be any suitable non-transitory storage medium (flash, hard disk, etc.) configured to store information at the mobile computing device 104, such as a set of instructions for execution by the processor 200.

The mobile computing device 104 can also be configured to perform at least a portion of the techniques of the present disclosure. Initially, the mobile computing device 104 can establish a first cellular connection with the first cellular carrier 120a of the MVNO 124. This first cellular connection may be established, for example, based on a location of the mobile computing device 104. For example only, the mobile computing device 104 may know or be notified of particular regions where the first cellular carrier 120a is preferred. As conditions change, however, a change to the second cellular carrier 120b of the MVNO 124 may be desired. More particularly, the mobile computing device 104 may detect one or more conditions indicative of (i) a lack of cellular activity via the first cellular connection and (ii) an available second cellular connection via the second cellular carrier 120b associated with the MVNO.

In one implementation, the condition includes a location of the mobile computing device 104 leaving a region associated with the first cellular carrier 120a. For example, the mobile computing device 104 may enter a region associated with the second cellular carrier 120b. In one implementation, the condition includes an inactive state of the user interface 108 of the mobile computing device 104. Such a condition can be indicative of the user 112 not currently providing input to or otherwise interacting with the mobile computing device 104. Examples of the inactive state include, but are not limited to, a display of the user interface 108 being deactivated/off and/or the mobile computing device 104 being in a sleep/low-power mode. Even during such an inactive state of the user interface 108, however, the condition may not be present. In one implementation, the condition includes an absence of in-progress downloads to the mobile computing device 104 via the first cellular connection. For example, such downloads could be occurring in a background of the mobile computing device 104, even though the user 112 is not actively using the mobile computing device 104.

In another implementation, the condition includes inactivity by one or more priority software applications executable by the mobile computing device 104. Such priority software application(s), if currently executing, may require an uninterrupted cellular connection. Examples of priority software applications include, but are not limited to, emergency dialer/location applications and operating system update applications. In another implementation, the condition can include the mobile computing device 104 being connected to a non-cellular network, such as a WiFi computing network. Optionally, the condition can further include the mobile computing device 104 being connected to a battery charging source (e.g., outlet power) in addition to being connected to the non-cellular network, thereby preventing excessive carrier switching that could drain battery charge.

In another implementation, the condition can include a predicted period of inactivity between the mobile computing device 104 and the user 112 (i.e., user-specific) or an average/aggregate user. Habits/usage patterns of the user 112, for example, may be known by the mobile computing device 104, such as times of day when the user 112 typically uses the mobile computing device 104. Alternatively, habits, usage patterns for an average/aggregate user can be utilized. For example, the average/aggregate user may utilize their mobile computing device 104 whenever they are in an elevator. Alternatively, for example, the average/aggregate user may take a break after finishing streaming a movie or television episode. In yet another implementation, the condition can include signal strength of the first cellular connection being below a threshold indicative of an unacceptable cellular connection. Rather, the first cellular connection may be so poor that the user 112 may be unaware of or not care about the latency caused by a carrier switch. The condition can also include any combination of the examples discussed above.

As previously mentioned, the above are merely examples of the condition. Further, any combination of two or more of the conditions could be required. Another example condition could include a processing load of current/future activities. For example, watching a movie can require substantially more processing power compared to texting. Other example conditions can include data pricing differences between the cellular carriers 120 (e.g., minimize user costs), locations changes (e.g., crossing of proprietary coverage-indicative geo-fences), less than a particular signal strength threshold for greater than a particular threshold period, and a network outage. The network outage, for example, cannot be determined by the mobile computing device 104 because the mobile computing device 104 would be unable to maintain its cellular connection. A remote server associated with the cellular carriers 120 and the MVNO 124, on the other hand, could determine whether a network outage has occurred and, if so, this could be taken into account in determining whether to switch between cellular carriers 120 at the mobile computing device 104.

In response to detecting the condition, the mobile computing device 104 can perform a switch to the second cellular carrier 120b. This can include, for example, terminating the first cellular connection and initiating a second cellular connection with the second cellular carrier 120b. In some implementations, the second cellular connection may end up being worse than the first cellular connection. In these scenarios, the process may repeat and the condition may be detected, upon which a switch back to the first cellular connection may be performed. Alternatively, in these scenarios, a third different cellular carrier (not shown) may be associated with the MVNO 124, and upon detecting the condition, a switch to the third cellular carrier may be performed. This entire process can then be repeated over time, such as when the mobile computing device 104 moves locations into a different region where a different cellular carrier may be expected to provide a better cellular connection.

Figure 3:
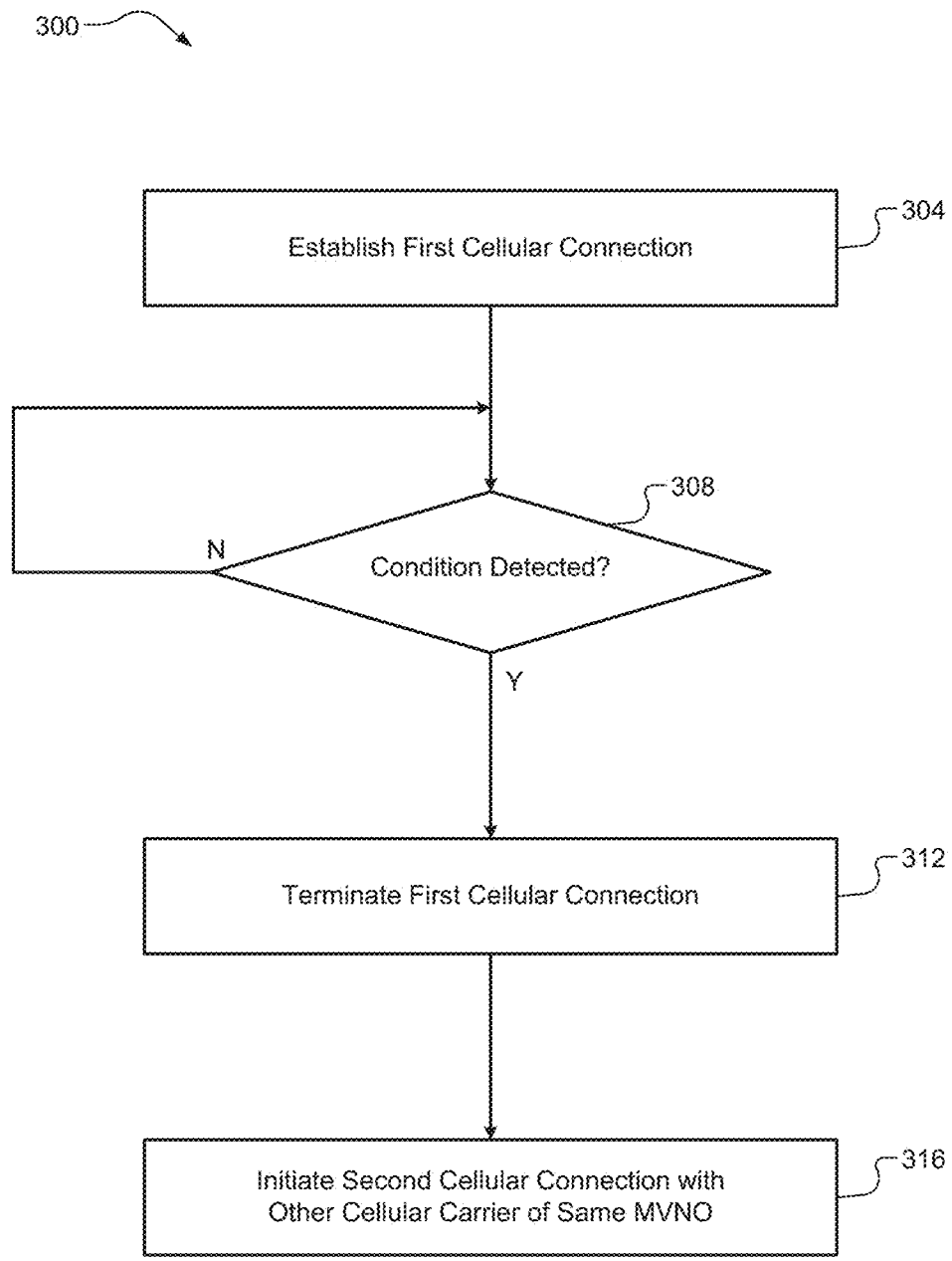
FIG. 3 is a flow diagram of an example technique for minimizing user disruption when switching between different cellular carriers of a mobile virtual network operator (MVNO) according to some implementations of the present disclosure.

Referring now to FIG. 3, a flow diagram of an example technique for minimizing user disruption when switching between different cellular carriers of an MVNO is illustrated. At 304, the mobile computing device 104 can establish a first cellular connection with the first cellular carrier 120a associated with the MVNO 124. At 308, the mobile computing device 104 can detect a condition indicative of (i) a lack of cellular activity via the first cellular connection and (ii) an available second cellular connection with the second cellular carrier 120b associated with the MVNO 124. If the condition is detected, the technique 300 can proceed to 312. Otherwise, the technique 300 can end or return to 308. At 312, the mobile computing device 104 can terminate the first cellular connection. At 316, the mobile computing device 104 can initiate the second cellular connection with the second cellular carrier 120b associated with the MVNO 124. For example only, the termination may include transmitting a termination signal to the first cellular carrier 120a and the initiation may include exchanging authentication information with the second cellular carrier 120b to establish the second cellular connection. In one implementation, the first cellular connection can be terminated concurrently with the initiation of the second cellular connection (e.g., when the mobile computing device 104 has two or more cellular radios). The technique 300 can then end or return to 304 for one or more additional cycles (e.g., to potentially switch back to the first cellular connection, or to switch to a better third cellular connection with a different third cellular carrier associated with the MVNO 124).

In another implementation, as mentioned above, the mobile computing device 104 can include a plurality of communication devices 204 (cellular radios, transceivers, etc.) and two or more different communication devices 204 could be connected to two or more cellular carriers at a given time. In this example, there would be no disruption in user activity when performing the carrier switch. More particularly, the second cellular connection could be separately initiated regardless of the connection strength of the first cellular connection. For example only, the second cellular connection could be established the entire time that the first cellular connection is established. Thus, the mobile computing device can immediately switch to the second cellular connection when any decrease in connection strength via the first cellular connection is detected. Implementing multiple cellular radios, however, may increase device costs/complexity and/or decrease battery life.

Further to the descriptions above, a user may be provided with controls allowing the user to make an election as to both if and when systems, programs or features described herein may enable collection of user information (e.g., information about a user's current location or about the user's current cellular contract/billing plan), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
   establishing, by a mobile computing device having one or more processors, a first cellular connection between the mobile computing device and a first cellular carrier associated with a mobile virtual network operator (MVNO);
   detecting, by the mobile computing device, a condition indicative of (i) a level of cellular activity via the first cellular connection below an inactivity threshold, (ii) an available second cellular connection with a different second cellular carrier associated with the MVNO, (iii) a signal strength difference between the first cellular connection with the first cellular carrier associated with the MVNO and the available second cellular connection with the different second cellular carrier associated with the MVNO is greater than a minimum strength improvement threshold, and (iv) a predicted period of inactivity between the mobile computing device and a user based on usage patterns of the user; and
   in response to detecting the condition:
   (a) terminating, by the mobile computing device, the first cellular connection, and
   (b) initiating, by the mobile computing device, the second cellular connection with the second cellular carrier associated with the MVNO.

2. The computer-implemented method of claim 1, wherein the condition includes an inactive state of a user interface of the mobile computing device.

3. The computer-implemented method of claim 1, wherein the condition includes inactivity by one or more priority software applications executable by the mobile computing device.

4. The computer-implemented method of claim 1, wherein the condition includes the mobile computing device being connected to a non-cellular network.

5. The computer-implemented method of claim 4, wherein the non-cellular network is a WiFi network.

6. The computer-implemented method of claim 5, wherein the condition further includes the mobile computing device being connected to a battery charging source.

7. The computer-implemented method of claim 1, wherein the predicted period of inactivity is either for (i) the user or (ii) an average user.

8. The computer-implemented method of claim 1, wherein the condition includes an absence of in-progress downloads to the mobile computing device via the first cellular connection.

9. The computer-implemented method of claim 1, wherein the condition includes signal strength of the first cellular connection being below a threshold indicative of an unacceptable cellular connection.

10. A mobile computing device comprising:
    a memory configured to store a set of instructions;
    a communication device configured to transmit and receive information; and
    one or more processors configured to execute the set of instructions, which causes the one or more processors to perform operations comprising:
    controlling the communication device to establish a first cellular connection between the mobile computing device and a first cellular carrier associated with a mobile virtual network operator (MVNO);
    detecting a condition indicative of (i) a level cellular activity via the first cellular connection below an inactivity threshold, (ii) an available second cellular connection with a different second cellular carrier associated with the MVNO, (iii) a signal strength difference between the first cellular connection with the first cellular carrier associated with the MVNO and the available second cellular connection with the different second cellular carrier associated with the MVNO is greater than a minimum strength improvement threshold, and (iv) a predicted period of inactivity between the mobile computing device and a user based on usage patterns of the user; and
    in response to detecting the condition, controlling the communication device to:
    (a) terminate the first cellular connection, and
    (b) initiate the second cellular connection with the second cellular carrier associated with the MVNO.

11. The mobile computing device of claim 10, wherein detecting the condition comprises the one or more processors detecting an inactive state of a user interface of the mobile computing device.

12. The mobile computing device of claim 10, wherein detecting the condition comprises the one or more processors detecting inactivity by one or more priority software applications executable by the mobile computing device.

13. The mobile computing device of claim 10, wherein detecting the condition comprises the one or more processors detecting that the mobile computing device is connected to a non-cellular network.

14. The mobile computing device of claim 13, wherein the non-cellular network is a WiFi network.

15. The mobile computing device of claim 14, wherein detecting the condition further comprises the one or more processors detecting that the mobile computing device is connected to a battery charging source.

16. The mobile computing device of claim 10, wherein the predicted period of inactivity is either for (i) the user or (ii) an average user.

17. The mobile computing device of claim 10, wherein detecting the condition comprises the one or more processors detecting an absence of in-progress downloads to the mobile computing device via the first cellular connection.

18. The mobile computing device of claim 10, wherein detecting the condition comprises the one or more processors detecting a signal strength of the first cellular connection below a threshold indicative of an unacceptable cellular connection.

\* \* \* \* \*